United States Patent
Wang et al.

(10) Patent No.: US 7,212,000 B2
(45) Date of Patent: May 1, 2007

(54) DETECTION OF A DEFECTIVE DISK OF A HARD DISK DRIVE

(75) Inventors: Geng Wang, San Jose, CA (US); Sang Lee, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 355 days.

(21) Appl. No.: 10/698,866

(22) Filed: Oct. 30, 2003

(65) Prior Publication Data

US 2005/0117241 A1 Jun. 2, 2005

(51) Int. Cl.
*G01B 7/00* (2006.01)
(52) U.S. Cl. ..................................... 324/212
(58) Field of Classification Search ................ 324/212
See application file for complete search history.

(56) References Cited

U.S. PATENT DOCUMENTS 5,050,169 A * 9/1991 Monett ........................ 714/719

7,031,103 B2 * 4/2006 Yoo ........................ 360/97.01

* cited by examiner

*Primary Examiner*—Bot LeDynh
(74) *Attorney, Agent, or Firm*—Ben J. Yorks; Irell & Manella LLP

(57) ABSTRACT

A method and apparatus for detecting a defective disk for a hard disk drive. The method includes placing a disk into a tester so that a first side of the disk is adjacent to a first head of the tester and a second side of the disk is adjacent to a second head. First data is read from the first side of the disk, and second data is read from the second side of the disk. The disk is then flipped so that the second side is adjacent to the first head and the first side is adjacent to the second head. Third data is read from the first side. Fourth data is read from the second side. A first area between a curve generated from the first data and a curve generated from the third data is calculated. Likewise, a second area is calculated between a curve generated from the second data and a curve generated from the fourth data. An average of the first and second areas is then calculated and used to detect a defective disk.

15 Claims, 4 Drawing Sheets

DETECTION OF A DEFECTIVE DISK OF A HARD DISK DRIVE

BACKGROUND OF THE INVENTION

1. Field of the Invention

The present invention relates to a method for detecting a defective disk of a hard disk drive.

2. Background Information

Hard disk drives contain a plurality of magnetic heads that are coupled to rotating disks. The heads write and read information by magnetizing and sensing the magnetic fields of the disk surfaces.

Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks. The disks are rotated by a spindle motor of the disk drive.

The bottom surface of each head has an air bearing surface that cooperates with an airflow generated by the rotating disks to create an air bearing between the head and the disk surface. The air bearing prevents or minimizes contact and resultant mechanical wear between the head and the disk. The field strength of the magnetic field detected by a head is inversely proportional to the height of the air bearing. It is therefore desirable to maintain a small air bearing while minimizing mechanical wear. The height of the air bearing is commonly referred to as the flying height of the head.

Each disk is typically constructed from a substrate that is coated with various layers of magnetic material. Manufacturing processes may introduce imperfections in the disk such as a disk curvature or surface waviness. Disk curvature or surface waviness may change the flying height of the head and increase the bit error rate (BER) of the drive. A drive with an unacceptable BER must be repaired or discarded. It would be desirable to detect and screen such disk imperfections before assembling the disk into a hard disk drive, to reduce the repair or discard rate of the drives.

BRIEF SUMMARY OF THE INVENTION

A method and apparatus for detecting a defective disk for a hard disk drive. The method includes placing a disk onto a tester so that a first side of the disk is adjacent to a first head of the tester and a second side of the disk is adjacent to a second head. First data is read and stored from the first side and second data is read and stored from the second side of the disk. The disk is then flipped so that the second side is adjacent to the first head and the first side is adjacent to the second head. Third data is read and stored from the first side. Fourth data is read and stored from the second side. A first area is calculated between a curve generated from the first data and a curve generated from the third data. Likewise, a second area is calculated between a curve generated from the second data and a curve generated from the fourth data. An average of the first and second areas is then calculated. A defective disk can be detected from the calculated average.

DETAILED DESCRIPTION

Disclosed is a method and apparatus for detecting a defective disk for a hard disk drive. The disk is typically tested before being assembled into a hard disk drive assembly. The method includes placing a disk into a tester so that a first side of the disk is adjacent to a first head of the tester and a second side of the disk is adjacent to a second head. First data is read from the first side of the disk, and second data is read from the second side of the disk.

The disk is then flipped so that the second side is adjacent to the first head and the first side is adjacent to the second head. Third data is read from the first side. Fourth data is read from the second side. A first area is calculated between a curve generated from the first data and a curve generated from the third data. Likewise, a second area is calculated between a curve generated from the second data and a curve generated from the fourth data. An average of the first and second areas is then calculated. The average can be compared to a threshold value. An average value above the threshold may be indicative of a defective disk. The defective disk may be discarded or repaired before assembly into a hard disk drive assembly.

Figure 1:
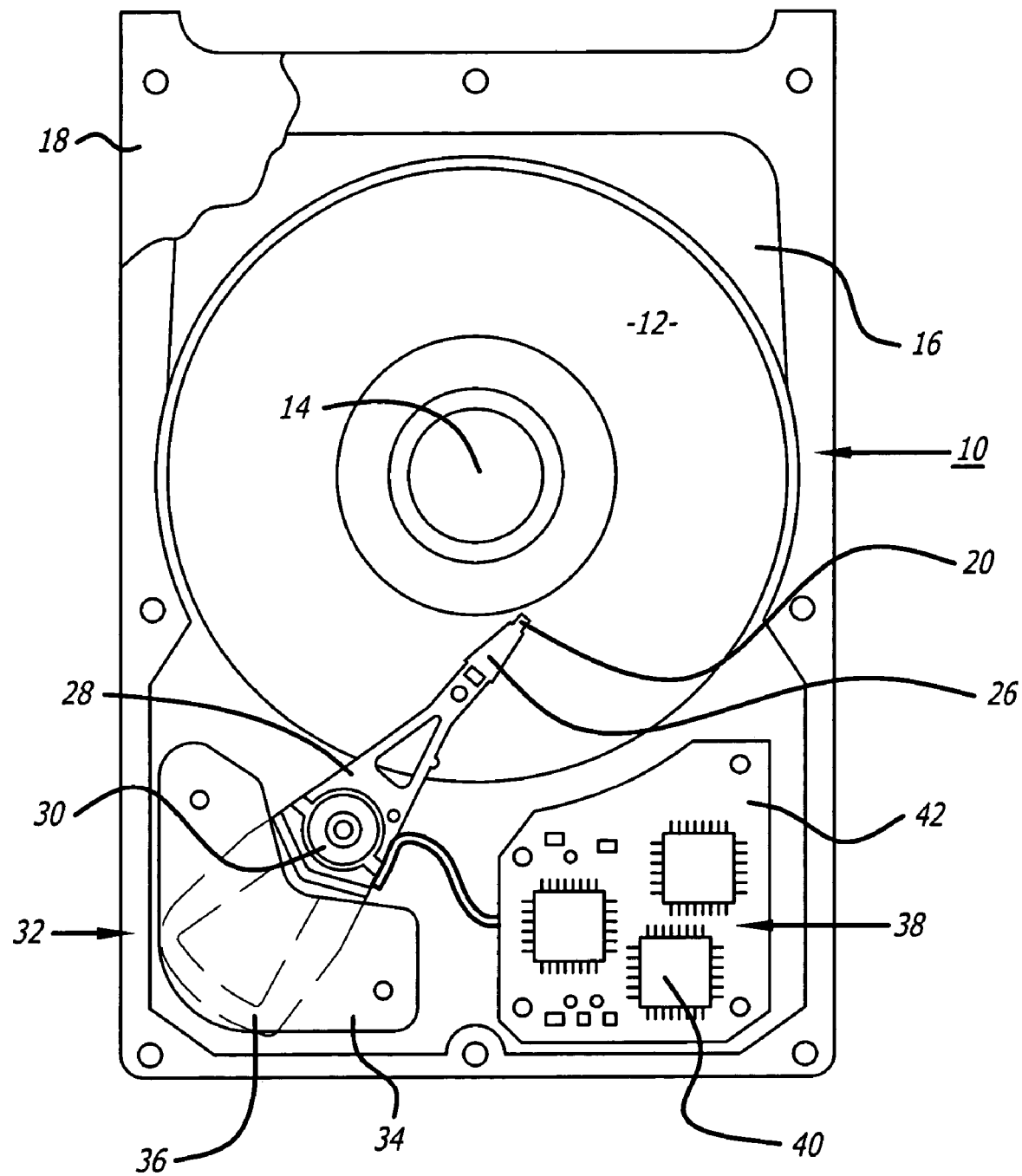
FIG. 1 is a top view of an embodiment of a hard disk drive.

Referring to the drawings more particularly by reference numbers, by way of background FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write (not shown) and read elements (not shown). The write element magnetizes the disk 12 to write data. The read element senses the magnetic fields of the disks 12 to read data. By way of example, the read element may be constructed from a magneto-resistive material that has a resistance which varies linearly with changes in magnetic flux. Heads 20 constructed with magneto-resistive material are commonly referred to as MR heads. Although MR heads it is to be understood that other head types, such as inductive heads, may be assembled into the drive.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
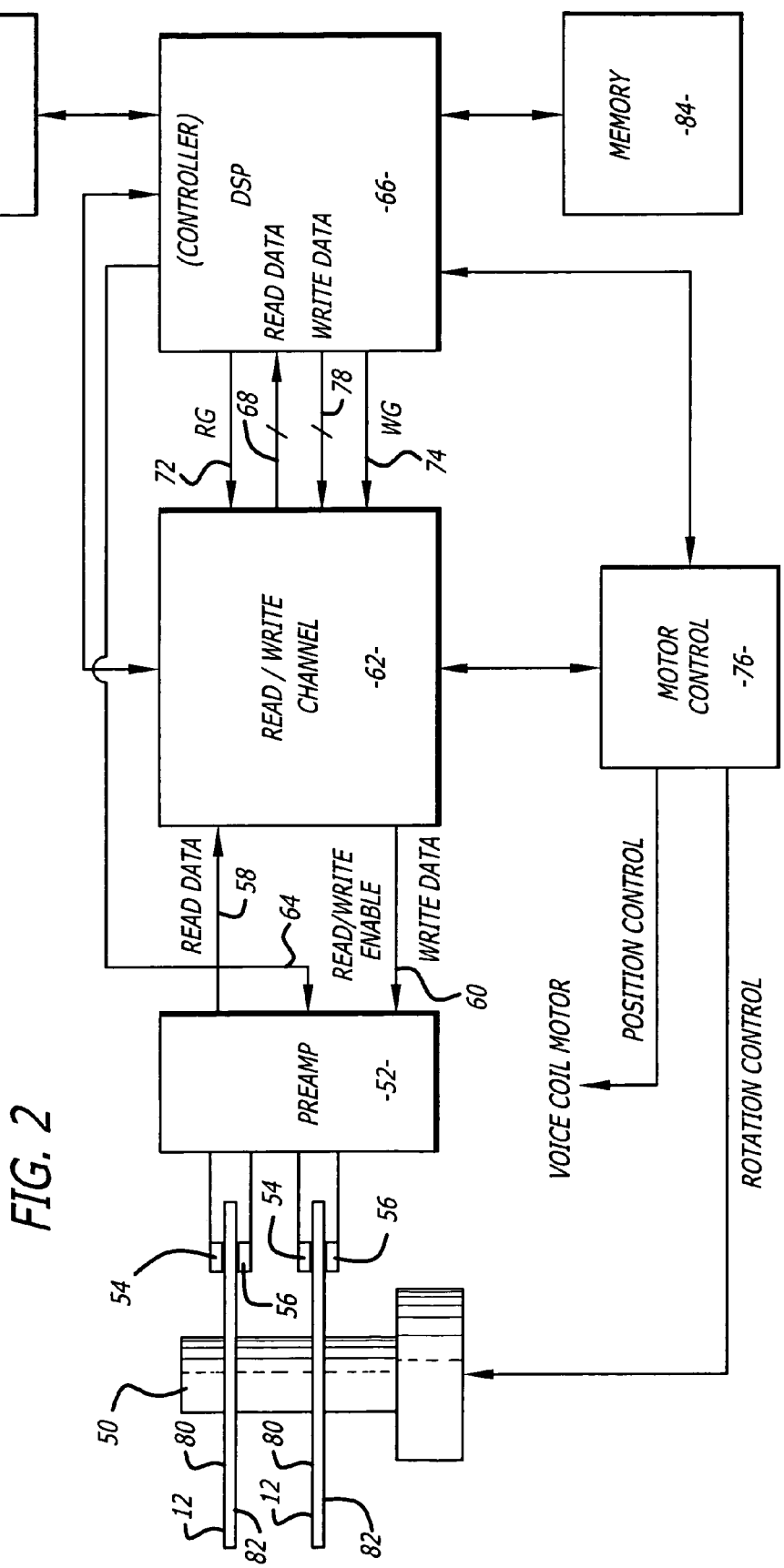
FIG. 2 is a schematic of a tester for detecting a defective disk.

FIG. 2 shows a tester 50 for testing surface irregularities of disks 12. The disks 12 may be rotated by a spindle 50. The tester may include a pre-amplifier circuit 52 that is coupled to a plurality of first heads 54 and a plurality of second heads 56. The pre-amplifier circuit 52 has a read data channel 58 and a write data channel 60 that are connected to a read/write channel circuit 62. The pre-amplifier 52 also has a read/write enable gate 64 connected to a controller 66. Data can be written onto the disks 12, or read from the disks 12 by enabling the read/write enable gate 64.

The read/write channel circuit 62 is connected to the controller 66 through read and write channels 68 and 70, respectively, and read and write gates 72 and 74, respectively. The read gate 72 is enabled when data is to be read from the disks 12. The write gate 74 is to be enabled when writing data to the disks 12. The controller 66 may be a digital signal processor that operates in accordance with a software routine, including a routine(s) to write and read data from the disks 12.

The read/write channel circuit 62 and controller 66 may also be connected to a motor control circuit 76 which controls a voice coil motor (not shown) and the spindle motor 50. The voice coil motor can move the heads 54 and 56 across disk surfaces 80 and 82, or 82 and 80, respectively. The controller 66 may be connected to a non-volatile memory device 84. By way of example, the device 84 may be a read only memory ("ROM"). The non-volatile device 84 may contain a program with instructions that cause the controller 66 to determine the disk surface irregularities. The controller 66 may also be connected to volatile memory 86 such as dynamic random access memory (DRAM). The volatile memory 86 may store data read from the disk 12.

Figure 3:
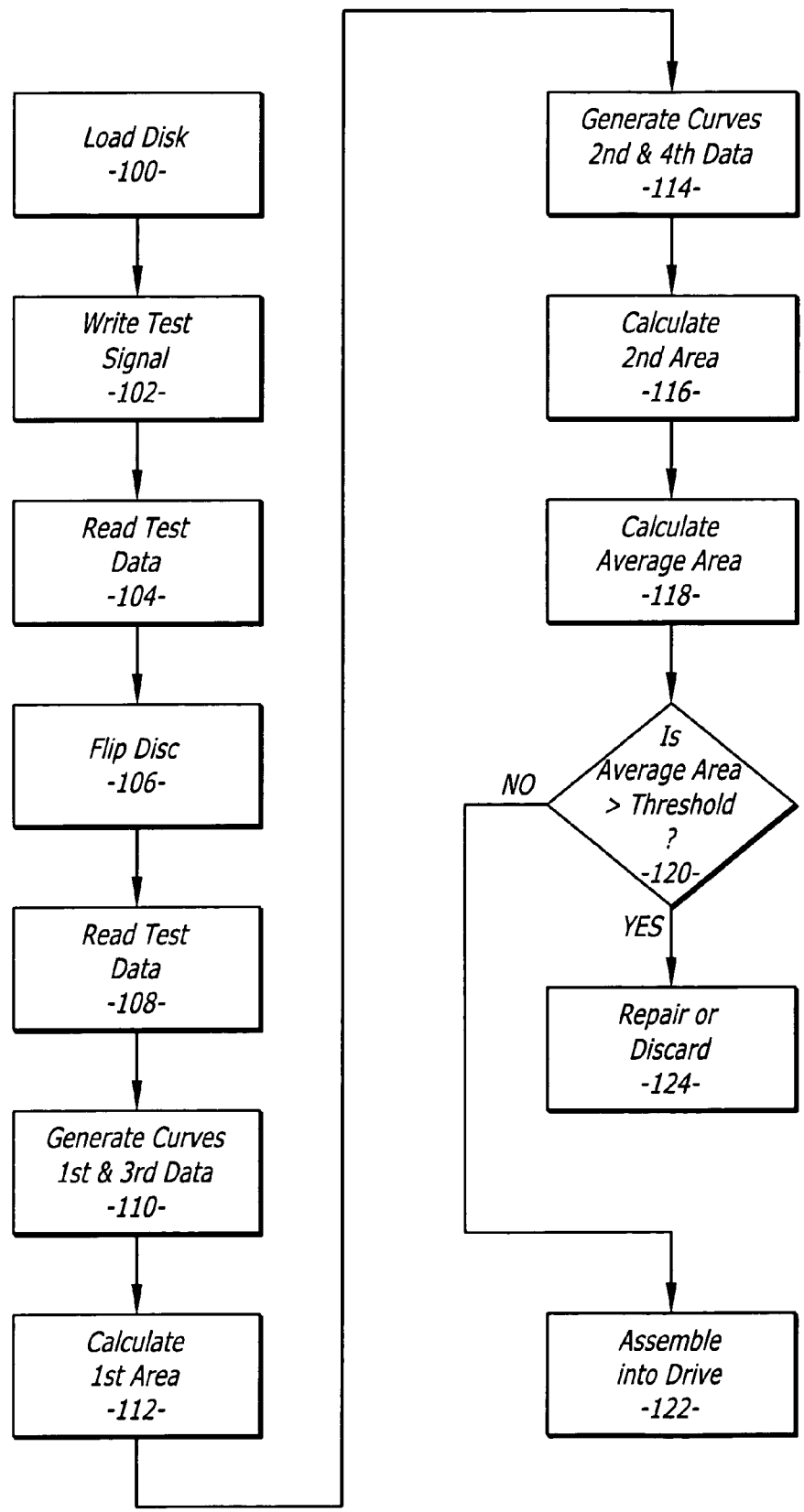
FIG. 3 is a flowchart showing a method for detecting a defective disk.

FIG. 3 is a flowchart showing a method for determining an irregularity(ies) in a disk. In block 100 a disk(s) is loaded into the tester so that a first side of the disk is adjacent to the first head and a second side of the disk is adjacent to the second head. A test signal(s) is written onto the first and second sides of the disk in block 102. The test signal may be a simple sinusoidal waveform.

The test signal(s) is read back from the first side and stored as first data and read from the second side and stored as second data in block 104. In block 106 the disk is removed, flipped and reinserted into the tester so that the second side of the disk is adjacent to the first head and the first side of the disk is adjacent to the second head.

The test signal(s) is read back from the second side and stored as third data and read from the first side and stored as fourth data in block 108. The first, second, third and fourth data may be the track average amplitude ("TAA") of the test signal. Alternatively, the first, second, third and fourth data may be the bit error rate ("BER") of the test signal.

Figure 4:
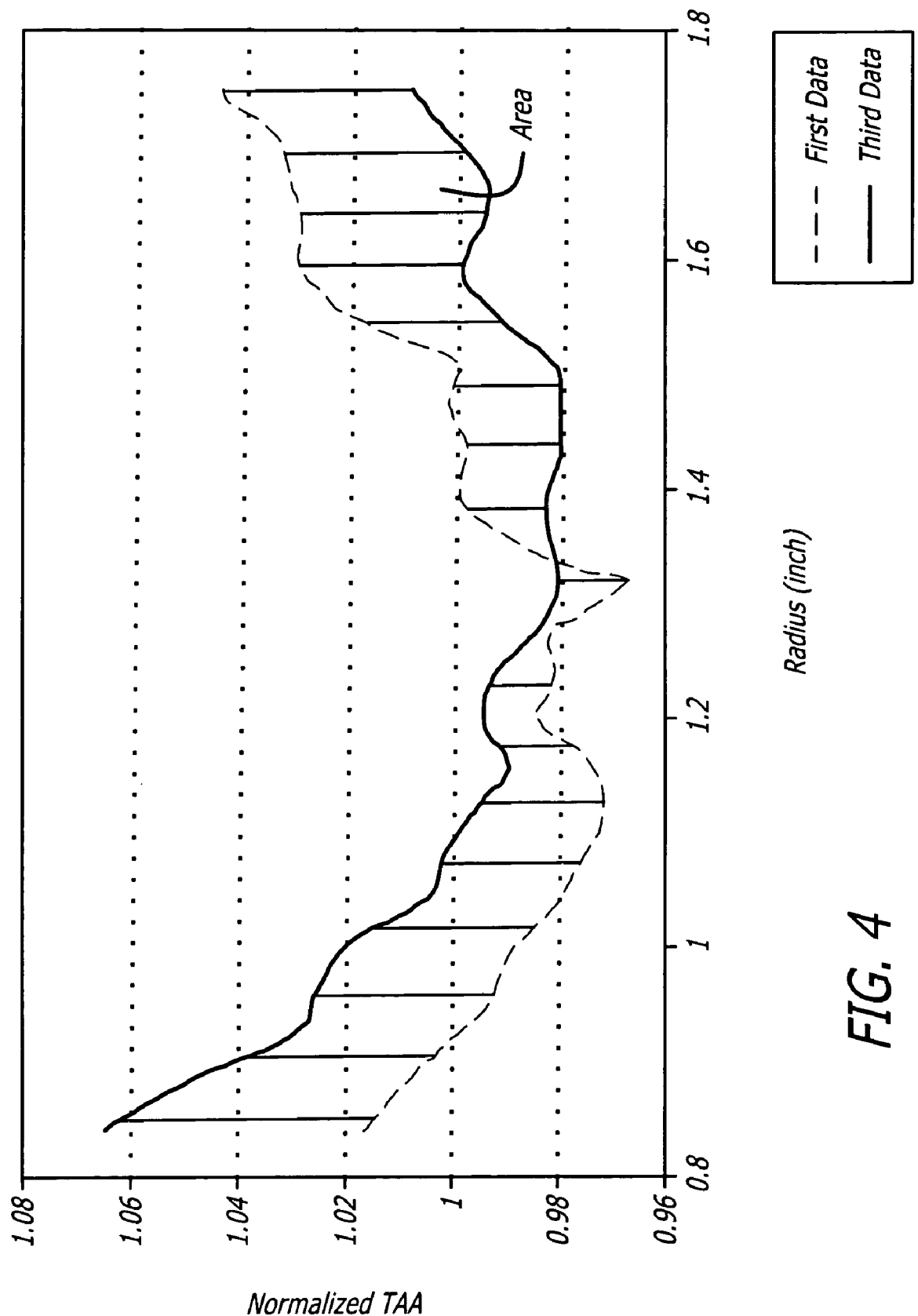
FIG. 4 is a graph constructed with data read from the disk.

In block 110 curves are generated from the first and third data. The area between the curves is then calculated and stored as a first area in block 112. Examples of curves and the differential area are shown in FIG. 4. A disk that is parallel, flat and otherwise has no surface irregularities would produce overlapping curves with an area equal to zero. A greater area between the curves represents greater surface irregularities in the disk.

Referring again to FIG. 3, in block 114 curves are generated from the second and fourth data. The area between the curves is calculated and stored as a second area in block 116. The average of the first and second areas is calculated in block 118. The average may be compared to a threshold value in decision block 120. If below the threshold the disk may be assembled into a disk drive in block 122, if above the threshold the disk may be repaired or discarded in block 124.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for detecting a defective disk for a hard disk drive, comprising:
    loading a disk that has a first side and a second side into a tester that has a first head located adjacent to the first side and a second head located adjacent to the second side;
    writing at least one test signal onto the first and second sides of the disk;
    reading and storing first data from the first side;
    reading and storing second data from the second side;
    loading the disk into the tester so that the second side is adjacent to the first head and the first side is adjacent to the second head;
    reading and storing third data from the first side;
    reading and storing fourth data from the second side;
    calculating a first area between a curve generated from the first data and a curve generated from the third data;
    calculating a second area between a curve generated from the second data and a curve generated from the fourth data;
    calculating the average of the first and second areas; and,
    determining whether the disk is defective using the calculated average.

2. The method of claim 1, wherein the first, second, third and fourth data are derived from a track amplitude average of signals written onto the disk.

3. The method of claim 1, wherein the first, second, third and fourth data are derived from a bit error rate of signals written onto the disk.

4. The method of claim 1, wherein the average of the first and second areas is compared to a threshold value.

5. The method of claim 4, wherein the disk is discarded if the average is above the threshold value.

6. A tester for detecting a defective disk for a hard disk drive, the disk having a first side and a second side, comprising:
    a spindle motor that rotates a disk;
    a first head coupled to the disk;
    a second head coupled to the disk;
    a controller that operates a test procedure, the test procedure reads and stores first data from the first side of the disk through said first head, reads and stores second data from the second side of the disk through said second head, reads and stores third data from the first side of the disk through said second head, reads and stores fourth data from the second side of the disk through said first head, calculates a first area between a curve generated from the first data and a curve generated from the third data, calculates a second area between a curve generated from the second data and a curve generated from the fourth data, and calculates the average of the first and second areas.

7. The tester of claim 6, wherein the first, second, third and fourth data are derived from a track amplitude average of signals written onto the disk.

8. The tester of claim 6, wherein the first, second, third and fourth data are derived from a bit error rate of signals written onto the disk.

9. The tester of claim 6, wherein the average of the first and second areas is compared to a threshold value.

10. The tester of claim 6, wherein said controller initially writes test signals onto the first and second sides of the disk.

11. A program storage medium that contains a program which causes a tester to detect a defective disk for a hard disk drive, the disk having a first side and a second side, the tester having a first head and a second head, comprising:

a program that causes a tester to read and store first data from the first side of the disk through the first head of the tester, read and store second data from the second side of the disk through the second head of the tester, read and store third data from the first side of the disk through the second head of the tester, read and store fourth data from the second side of the disk through the first head of the tester, calculate a first area between a curve generated from the first data and a curve generated from the third data, calculate a second area between a curve generated from the second data and a curve generated from the fourth data, and calculate the average of the first and second areas.

12. The medium of claim 11, wherein the first, second, third and fourth data are derived from a track amplitude average of signals written onto the disk.

13. The medium of claim 11, wherein the first, second, third and fourth data are derived from a bit error rate of signals written onto the disk.

14. The medium of claim 11, wherein the average of the first and second areas is compared to a threshold value.

15. The medium of claim 11, wherein said program causes said tester to initially write test signals onto the first and second sides of the disk.

* * * * *